US010013135B2

(12) United States Patent
Wen

(10) Patent No.: US 10,013,135 B2
(45) Date of Patent: Jul. 3, 2018

(54) ADJUSTABLE USER INTERFACES WITH MOVABLE SEPARATORS

(75) Inventor: Yandong Wen, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 1441 days.

(21) Appl. No.: 12/407,803

(22) Filed: Mar. 20, 2009

(65) Prior Publication Data
US 2010/0241989 A1 Sep. 23, 2010

(51) Int. Cl.
*G06F 3/0481* (2013.01)
*G06F 3/0488* (2013.01)

(52) U.S. Cl.
CPC ........ *G06F 3/0481* (2013.01); *G06F 3/04886* (2013.01); *G06F 2203/04803* (2013.01); *G09G 2340/00* (2013.01)

(58) Field of Classification Search
CPC .......... G06F 3/00; G06F 3/048; G06F 3/1423; G06F 3/0481; G06F 2203/04803; G06F 3/0482; G09G 2340/04; G09G 2340/0464; G09G 2340/0407; G09G 2340/0442
USPC ........................................ 715/798, 773, 827
See application file for complete search history.

(56) References Cited

U.S. PATENT DOCUMENTS

| | | | | |
|---|---|---|---|---|
| 5,712,995 A | * | 1/1998 | Cohn ............................ | 715/792 |
| 5,801,703 A | * | 9/1998 | Bowden et al. ............... | 715/841 |
| 6,067,502 A | | 5/2000 | Hayashida et al. | |
| 6,195,094 B1 | * | 2/2001 | Celebiler ..................... | 715/764 |
| 6,707,942 B1 | * | 3/2004 | Cortopassi et al. .......... | 382/186 |
| 6,724,370 B2 | * | 4/2004 | Dutta ..................... | G06F 1/1626 341/22 |
| 2002/0032696 A1 | * | 3/2002 | Takiguchi et al. ......... | 707/500.1 |
| 2003/0067481 A1 | * | 4/2003 | Chedgey et al. ............. | 345/738 |
| 2003/0159105 A1 | * | 8/2003 | Hiebert ......................... | 715/500 |
| 2004/0104896 A1 | * | 6/2004 | Suraqui ........................ | 345/168 |
| 2004/0210849 A1 | * | 10/2004 | Becker .......................... | 715/815 |
| 2005/0005235 A1 | * | 1/2005 | Satterfield et al. ........... | 715/519 |
| 2005/0057891 A1 | * | 3/2005 | Madsen et al. ............... | 361/680 |
| 2005/0171893 A1 | * | 8/2005 | Gaer ............................... | 705/37 |
| 2005/0188331 A1 | * | 8/2005 | Shimada et al. ............. | 715/816 |

(Continued)

OTHER PUBLICATIONS

Shizuki, et al., "VNC-Based Access to Remote Computers from Cellular Phones", Communication Systems and Networks, retrieved at <<http://citeseerx.ist.psu.edu/viewdoc/download;jsessionid=F9CBEB670DF7A2747106BB62D83C6B9F?doi=10.1.1.13.7157&rep=rep1&type=pdf>>, Sep. 9-12, 2002, pp. 1-6.

*Primary Examiner* — Doon Chow
*Assistant Examiner* — Le Nguyen
(74) *Attorney, Agent, or Firm* — Drinker Biddle & Reath LLP

(57) ABSTRACT

Tools and techniques for adjustable user interfaces with movable separators are provided. Display devices provided by these tools may include fixed-size hardware display screens. These display screens include input control portions that are responsive to user input to receive commands from users, and include output display portions for presenting output to users in response to the commands. These display screens also include separators that are movable along the display screens, with the separators dividing the input control portions from the output display portions. In response to movements of the separators, the input control portions and the output display portions are resized relative to one another.

17 Claims, 8 Drawing Sheets

(56) References Cited

U.S. PATENT DOCUMENTS

| | | |
|---|---|---|
| 2006/0026536 A1* | 2/2006 | Hotelling et al. ............ 715/863 |
| 2006/0055678 A1 | 3/2006 | Kleihorst et al. |
| 2007/0015534 A1 | 1/2007 | Shimizu |
| 2007/0132720 A1 | 6/2007 | Kang |
| 2007/0252822 A1* | 11/2007 | Kim et al. .................... 345/173 |
| 2008/0143673 A1 | 6/2008 | Park |
| 2008/0158189 A1 | 7/2008 | Kim |
| 2008/0163123 A1* | 7/2008 | Bernstein ...................... 715/853 |
| 2008/0176598 A1 | 7/2008 | Hur |
| 2008/0246851 A1 | 10/2008 | Jung et al. |
| 2009/0070098 A1* | 3/2009 | Patryshev ............. G06F 3/0238 704/3 |
| 2009/0088216 A1* | 4/2009 | Pichler et al. ............. 455/566 |
| 2009/0158190 A1* | 6/2009 | Higginson .................... 715/773 |
| 2009/0197635 A1* | 8/2009 | Kim et al. ................. 455/550.1 |
| 2009/0249235 A1* | 10/2009 | Kim et al. .................... 715/765 |
| 2009/0265627 A1* | 10/2009 | Kim et al. .................... 715/702 |
| 2009/0293007 A1* | 11/2009 | Duarte et al. ................ 715/767 |
| 2010/0011304 A1* | 1/2010 | van Os ........................ 715/762 |
| 2011/0252369 A1* | 10/2011 | Chaudhri ...................... 715/830 |

* cited by examiner

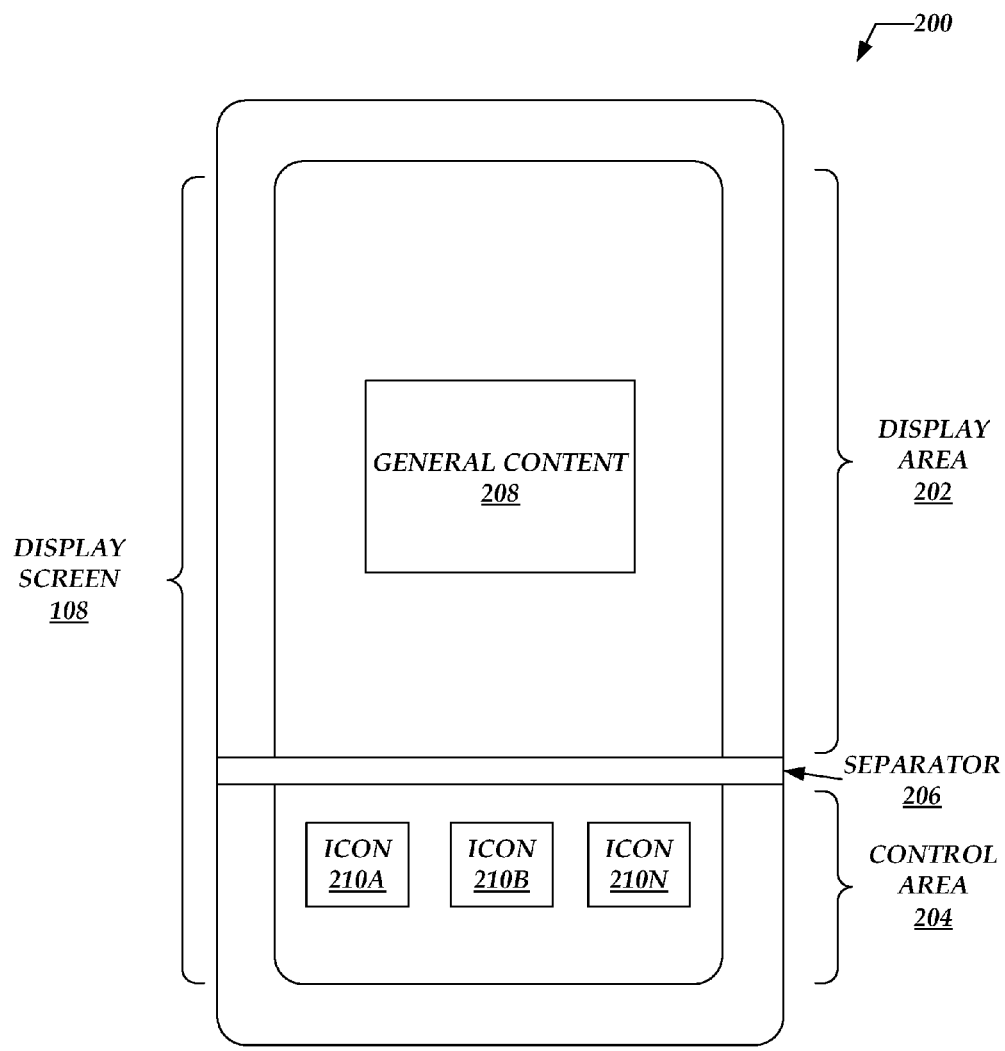
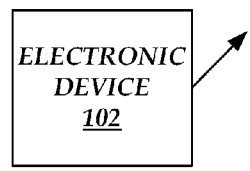
Fig. 2

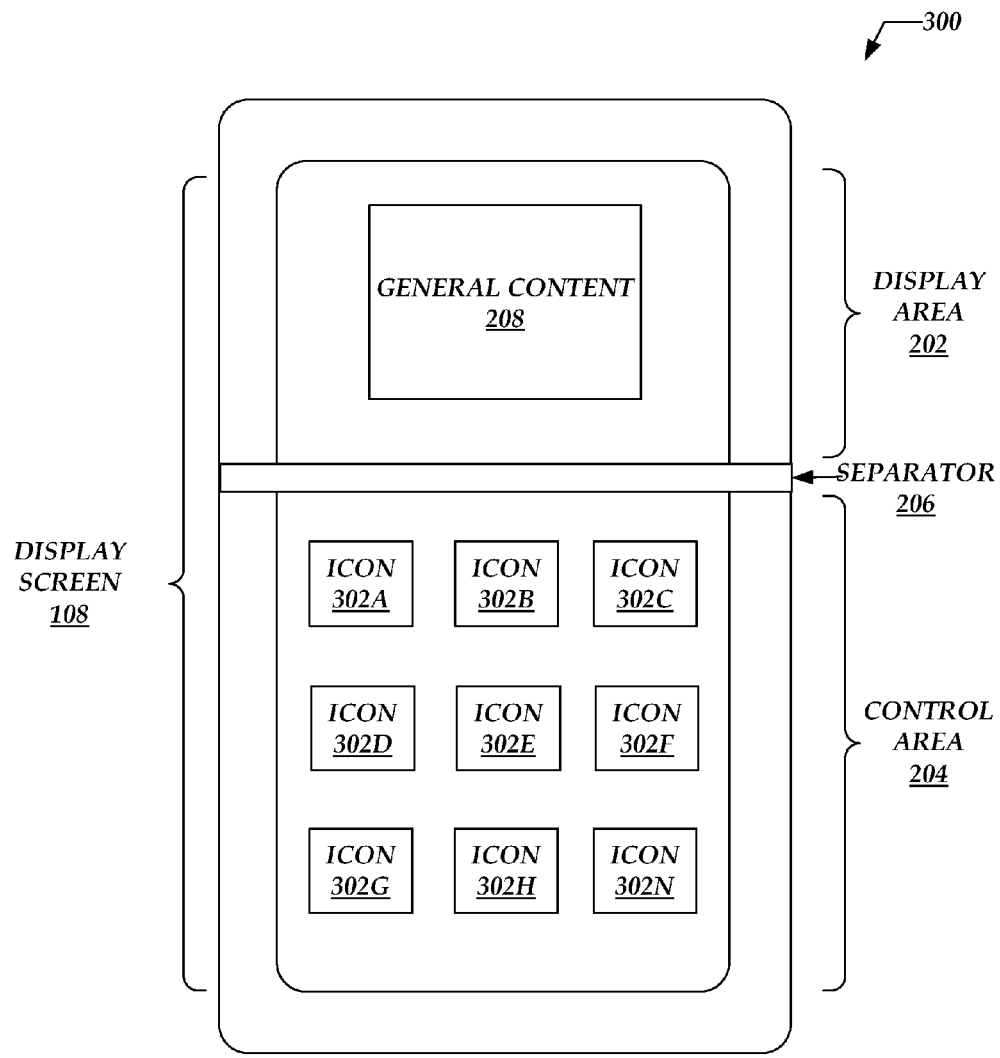
Fig. 3

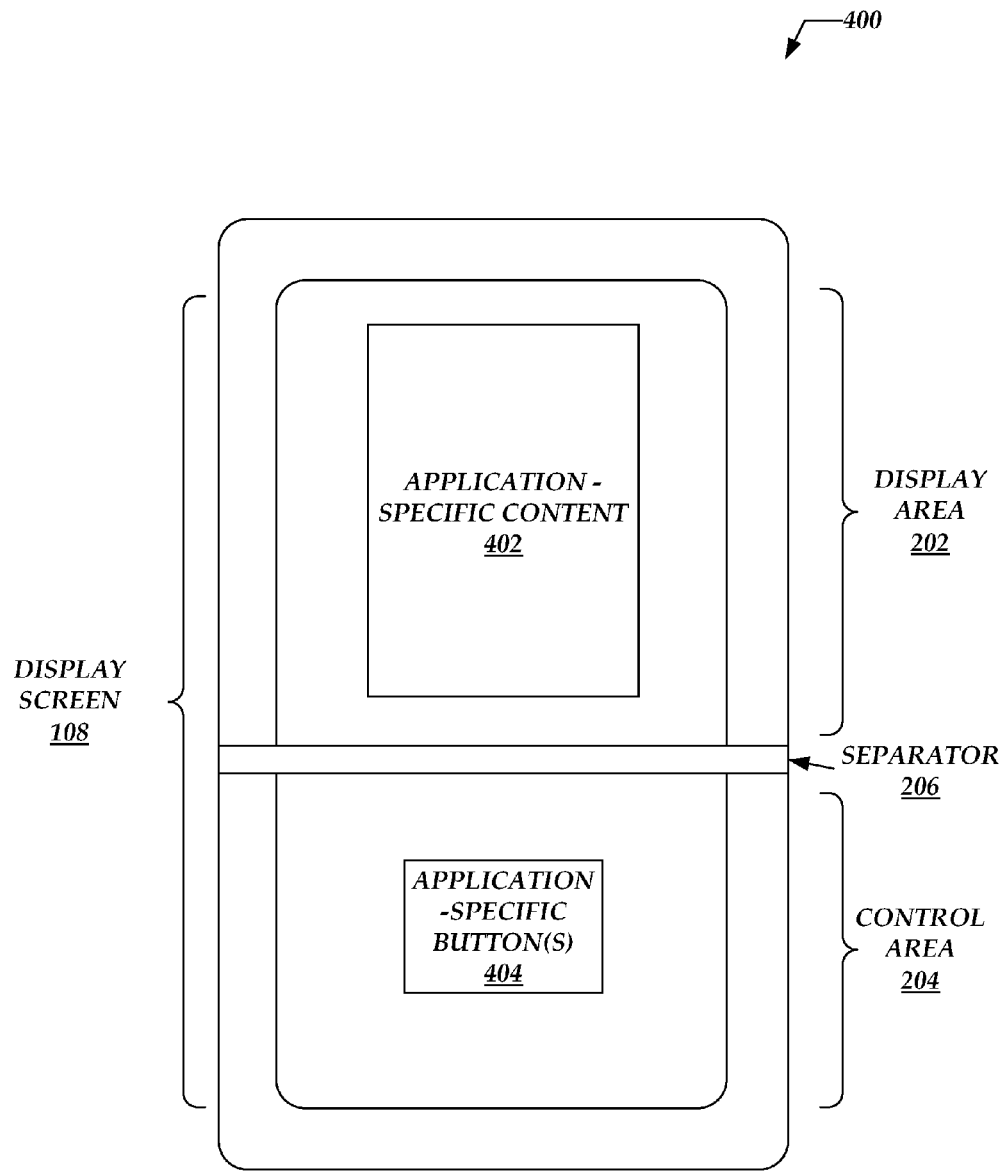
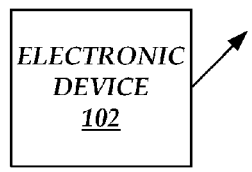
Fig. 4

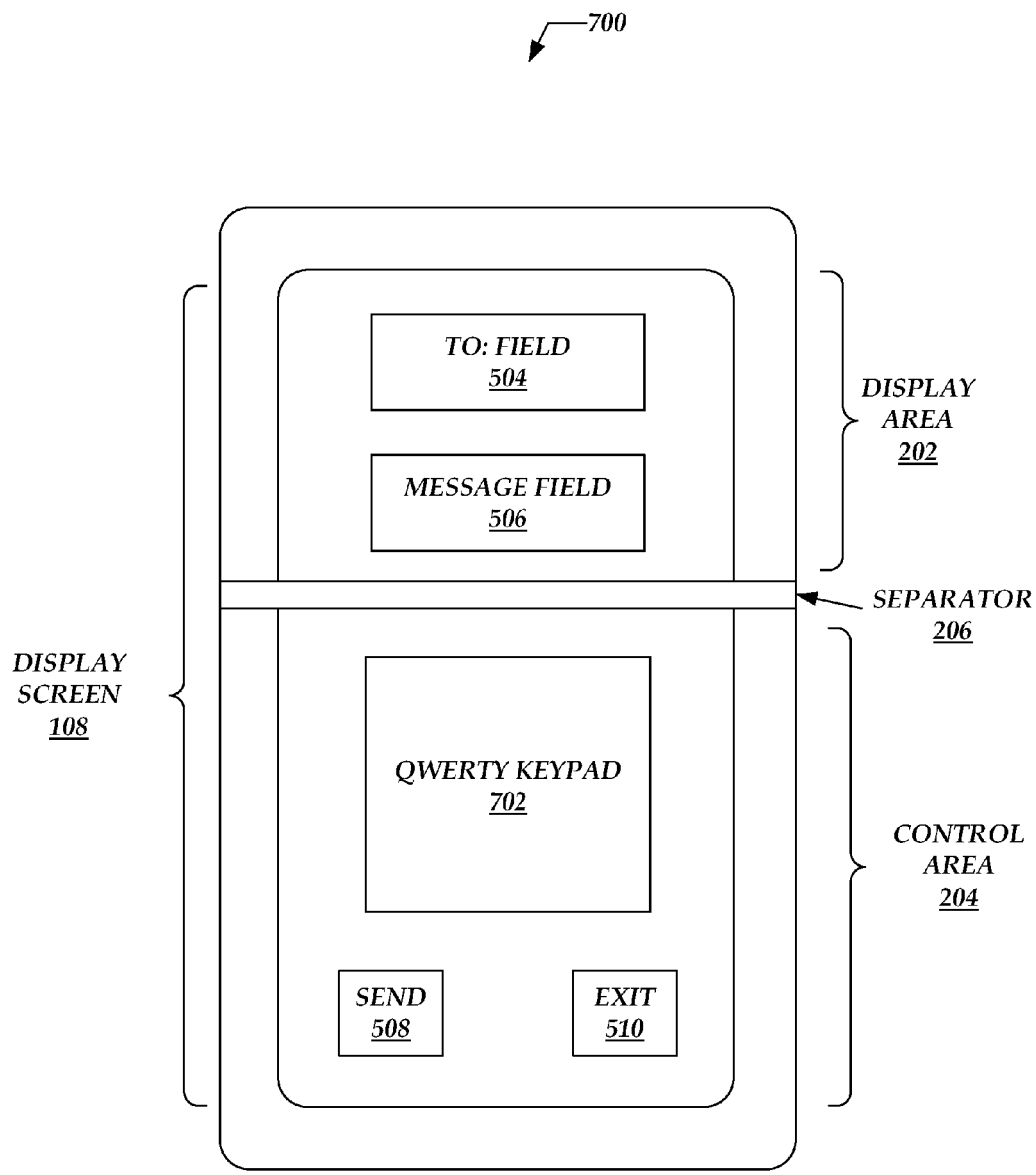
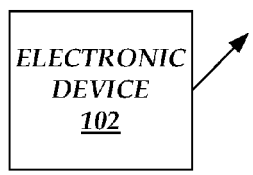
Fig. 7

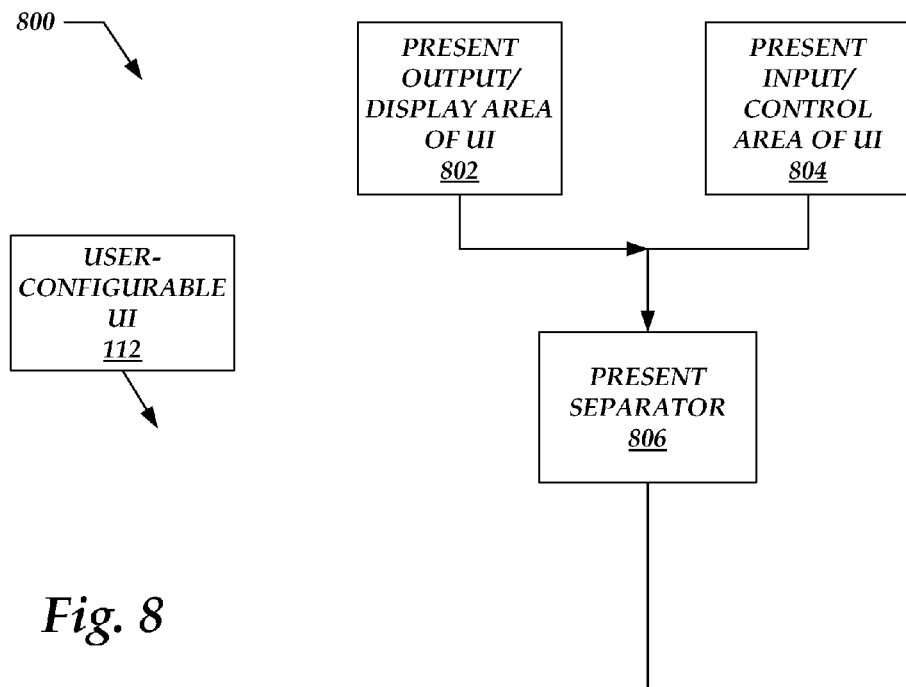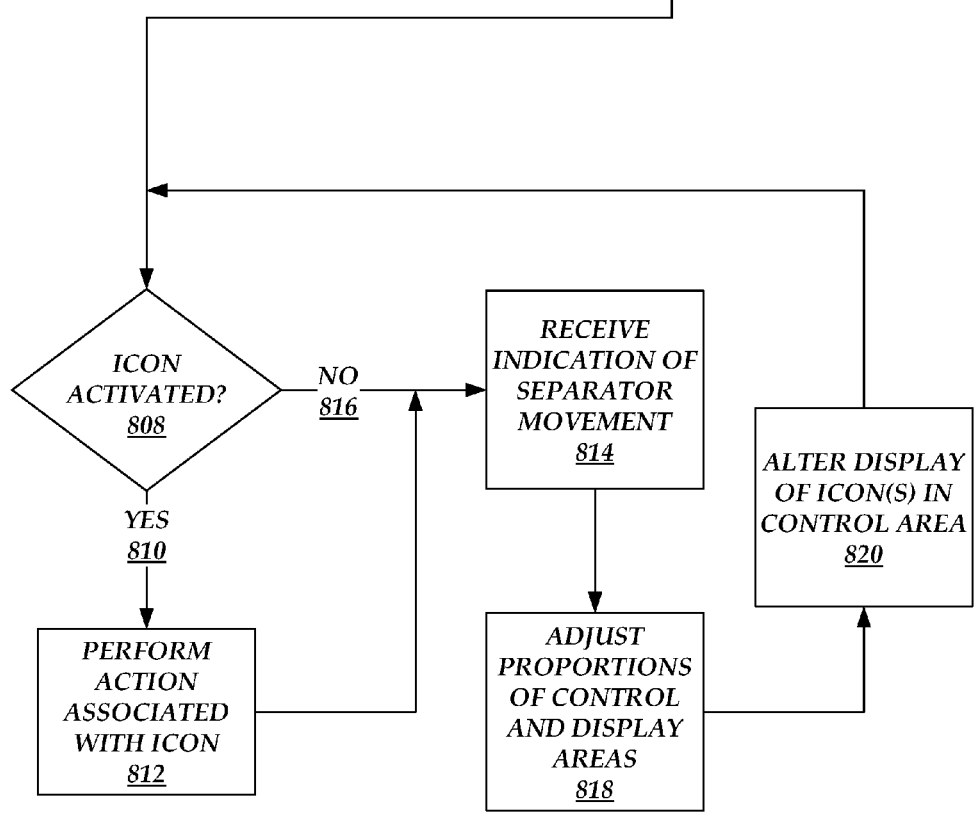
Fig. 8

ADJUSTABLE USER INTERFACES WITH MOVABLE SEPARATORS

BACKGROUND

Mobile devices typically provide fixed-size displays. In some cases, these mobile devices may also include hardware keys located in fixed positions on the device. Generally, these fixed-size displays and the fixed locations of the hardware keys drive the design of user interfaces provided by those mobile devices.

SUMMARY

Tools and techniques for adjustable user interfaces with movable separators are provided. Display devices provided by these tools may include fixed-size hardware display screens. These display screens include input control portions that are responsive to user input to receive commands from users, and include output display portions for presenting output to users in response to the commands. These display screens also include separators that are movable along the display screens, with the separators dividing the input control portions from the output display portions. In response to movements of the separators, the input control portions and the output display portions are resized relative to one another.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 is a block diagram illustrating example configurations of user interfaces that feature variable-sized display areas and control areas, partitioned by a sliding separator.

FIG. 3 is a block diagram illustrating further configurations of the user interfaces, with the control area depicting a plurality of icons.

FIG. 4 is a block diagram illustrating further configurations of the user interfaces, with the display area depicting application-specific content and the control area depicting application-specific buttons or icons.

FIG. 7 is a block diagram illustrating further configurations of the user interfaces, with the control area depicting example configurations of QWERTY keypads.

FIG. 8 is a flow chart illustrating processing that may be performed in connection with the adjustable user interfaces with movable separators.

DETAILED DESCRIPTION

Figure 1:
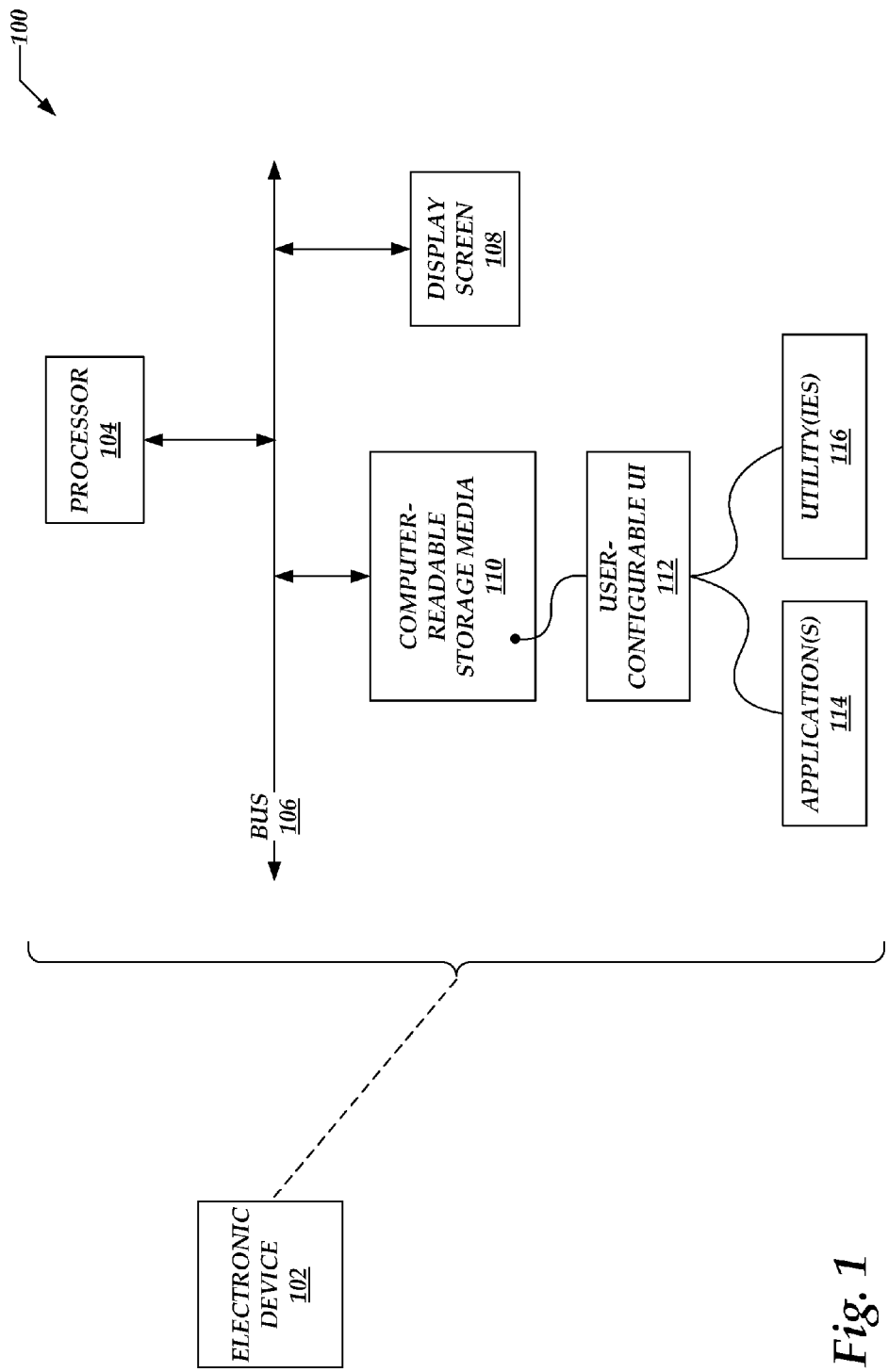
FIG. 1 is a combined block and flow diagram illustrating systems or operating environments suitable for adjustable user interfaces with movable separators.

The following detailed description provides tools and techniques for adjustable user interfaces with movable separators. While the subject matter described herein presents a general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The following detailed description refers to the accompanying drawings that form a part hereof, and that show, by way of illustration, specific example implementations. Referring now to the drawings, in which like numerals represent like elements through the several figures, this description provides various tools and techniques related to adjustable user interfaces with movable separators.

FIG. 1 illustrates systems or operating environments, denoted generally at 100, related to adjustable user interfaces with movable separators. Turning to FIG. 1 in more detail, these systems 100 may support any number of computer systems, electronic devices, and the like (referred to herein collectively as "electronic devices" 102). In different implementation scenarios, electronic devices 102 may include, but are not limited to: mobile devices; cellular telephones; smartphones; wireless-enabled personal digital assistants (PDAs); personal computers (PCs) whether characterized as desktops, notebooks, laptops, netbooks, or the like; and other similar devices.

Turning to the electronic devices 102 in more detail, these devices may include one or more instances of processing hardware, with FIG. 1 providing a processor 104 as an example of such processing hardware. The processors 104 may have a particular type or architecture, chosen as appropriate for particular implementations. In addition, the processors 104 may couple to one or more bus systems 106, having type and/or architecture that is chosen for compatibility with the processors 104.

The devices 102 may also include one or more display hardware or screens 108, coupled to communicate with the bus systems 106. The display screens 108 may take different forms, depending on the capabilities of different particular electronic devices 102. The display screens 108 may be constructed with any suitable technology, recognized as appropriate in different implementation scenarios. In general, the display screens 108 may present data or information in visible form to any number of human users associated with the electronic device 102. In addition, the display screens 108 may also receive input from those users, provided using any suitable input means. For example, the display screens may be implemented with touch-sensitive technology, and be responsive to user input registered by touch. However, implementations of this description may operate with other input mechanisms, without departing from the scope and spirit of this description.

The electronic devices 102 may include one or more instances of a physical computer-readable storage medium or media 110, which couple to the bus systems 106. The bus systems 106 may enable the processors 104 to read code and/or data to/from the computer-readable storage media 110. The media 110 may represent apparatus in the form of storage elements that are implemented using any suitable technology, including but not limited to semiconductors, magnetic materials, optics, or the like. The media 110 may represent memory components, whether characterized as RAM, ROM, flash, or other types of technology. The media 110 may also represent secondary storage, whether implemented as hard drives, CD-ROMs, DVDs, or the like. Hard drive implementations may be characterized as solid state, or may include rotating media storing magnetically-encoded information.

The storage media 110 may include one or more modules of software instructions that, when loaded into the processor 104 and executed, cause the electronic devices 102 to provide adjustable user interfaces with sliding separators. As detailed throughout this description, these modules of instructions may also provide various tools or techniques by which the electronic devices 102 may participate within the overall systems or operating environments 100 using the components, flows, and data structures discussed in more detail throughout this description. For example, the storage media 110 may include one or more software modules that implement the adjustable user interfaces with sliding separators.

In general, the software modules providing the adjustable user interfaces with sliding separators may, when loaded into the processors 104 and executed, transform the processors 104 and the overall electronic devices 102 from general-purpose computing systems into special-purpose computing systems customized to provide pressure-sensitive context menus. The processors 104 may be constructed from any number of transistors or other discrete circuit elements, which may individually or collectively assume any number of states. More specifically, the processor 104 may operate as a finite-state machine, in response to executable instructions contained within the software modules stored on the media 110. These computer-executable instructions may transform the processors 104 by specifying how the processors 104 transition between states, thereby physically transforming the transistors or other discrete hardware elements constituting the processors 104.

Encoding the software modules providing the pressure-sensitive context menus may also transform the physical structure of the storage media 110. The specific transformation of physical structure may depend on various factors, in different implementations of this description. Examples of such factors may include, but are not limited to: the technology used to implement the storage media 110, whether the storage media 110 are characterized as primary or secondary storage, and the like. For example, if the storage media 110 are implemented as semiconductor-based memory, the software implementing the adjustable user interfaces with sliding separators may transform the physical state of the semiconductor memory, when the software is encoded therein. For example, the software may transform the state of transistors, capacitors, or other discrete circuit elements constituting the semiconductor memory.

As another example, the storage media 110 may be implemented using magnetic or optical technology. In such implementations, the software implementing the adjustable user interfaces with sliding separators may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

The storage media 110 may include one or more instances of a user-configurable user interface (UI), which may be implemented as one or more software components or modules 112 that are operable with the processors 104. In addition, the storage media 110 may also include any number of software applications 114 and/or utilities 116. Examples of the applications 114 or utilities 116 may include, but are not limited to: utilities used to configure settings for the electronic devices 102; software supporting a digital camera included in the electronic devices 102; e-mail, IM, or text-messaging applications; time-management or calendaring applications; players and utilities for managing collections of multimedia digital content (e.g., music, video, pictures, and the like); game controller software; calculator functions; navigation utilities; note-taking applications; word processing, spreadsheet, database, or other types of application software; and the like.

FIG. 2 illustrates example configurations of user interfaces, denoted generally at 200, that feature variable-sized display areas and control areas, partitioned by a sliding separator. Without limiting possible implementations, FIG. 2 may be understood as elaborating further on the electronic devices 102, as shown in FIG. 1 and carried forward into FIG. 2.

Turning to the electronic devices 102 and related user interfaces 200 in more detail, FIG. 2 carries forward the display screen 108 from FIG. 1. The display screen 108 may have a fixed size, according to the dimensions of the hardware implementing the display screen 108. In addition, the display screen 108 may include a display area 202 for providing output visible to a user of the electronic device 102. The display screen 108 may also include a control area 204 responsive to user input directed to the electronic device 102.

The display screen 108 may also include a separator 206, which separates the split area 202 from the control area 204. As described in further detail below, the separator 206 may move relative to the display screen 108, and thereby adjust the relative sizes of the display area 202 and the control area 204. In the example shown in FIG. 2, if the separator 206 is moved upwards, the portion of the display screen 108 allocated to the display area 202 would shrink, and a portion of the display screen 108 allocated to the control area 204 would expand. Conversely, if the separator 206 is moved downwards, the display area 202 would expand, and the control area 204 would shrink.

For convenience only, FIG. 2 and other drawing Figures shown herein illustrates examples in which the display screen 108 is generally rectangular. However, other shapes and configurations of the display screen 108 are possible, without departing from the scope and spirit of the present description. In addition, FIG. 2 and other drawings herein illustrate examples in which the separator 206 is movable along the longer axis of the rectangular display screen 108. However, other movements of the separator 206 relative to the display screen 108 are possible in implementations of this description.

Turning to the display area 202 in more detail, as shown in FIG. 2, the display area 202 may display general content, denoted collectively at 208. This general content 208 may be independent of any particular applications or utilities (e.g., 114 and 116 in FIG. 1) that are installed on the electronic device 102. For example, the general content 208 may include background imagery or wallpaper, displays of dates and/or times, and the like.

Turning to the control area 204 in more detail, this control area 204 may include depictions of any number of icons, with FIG. 2 illustrating three examples of such icons at 210a, 210b, and 210n (collectively, icons 210). However, implementations of this description may include any number of icons 210, without departing from the scope and spirit of this description. In general, the icons 210 may respond to user selection or activation to perform various functions. For example, in some states of the display screen 108, the icon 210a may represent a telephone function, and may respond to user input to initiate or accept a telephone call using the electronic device 102. The icon 210b may represent a contact list or address book, and may respond to user input to open the address book or contact list. The icon 210n may collectively represent the applications 114 and/or utilities 116 installed on the electronic device 102, and may respond to user input to make these applications 114 and/or utilities 116 individually accessible to the user.

FIG. 3 illustrates further configurations of the user interfaces, denoted generally at 300. For example, the user interfaces may transition from the configurations shown in FIG. 2 to the configurations shown in FIG. 3 in response to the user selecting or activating the icon 210n. Recalling previous description, the icon 210n may collectively represent any number of applications 114 and/or utilities 116). In this scenario, the separator 206 may move upwards to shrink the control area 202, while also expanding the control area 204. In turn, the expanded control area 204 may depict any number of icons 302a-302n (collectively, icons 302). These icons 302 may represent any of the applications 114 and/or utilities 116 discussed above with FIG. 2. In addition, these icons 302 may respond to user input or activation to initiate the functions provided by the applications 114 and/or utilities 116 that correspond to the individual icons 302.

FIG. 4 illustrates further configurations of the user interfaces, denoted generally at 400. The user interfaces may transition from the configurations shown in FIG. 3 to the configurations shown FIG. 4, in response to the user activating one of the icons 302. Thus, the user interfaces 400 may relate to a particular application 114 or utility 116 that corresponds to the activated icon 302.

As shown in FIG. 4, the display area 202 may depict application-specific content 402, which relates to the application 114 or utility 116 whose icon 302 was activated by the user from the UIs 300 shown in FIG. 3. For example, assuming that the user activated an icon 302 from FIG. 3 that corresponds to a music player, the content 402 may include a picture of a recording artist or the like.

The control area 204 as shown in FIG. 4 may depict any number of application-specific buttons or icons, denoted collectively at 404. The number, type, and nature of these application-specific buttons 404 may vary, depending on the particular applications 114 or utilities 116 included in a given implementation. In the music player example introduced above, the application-specific buttons 404 may include buttons for playing a given song, stopping or pausing playback of the given song, selecting a particular song for playback, fast-forwarding or rewinding playback, and the like. However, implementations of this description may include other forms of application-specific buttons 404, not departing from the scope and spirit of the present description.

Figure 5:
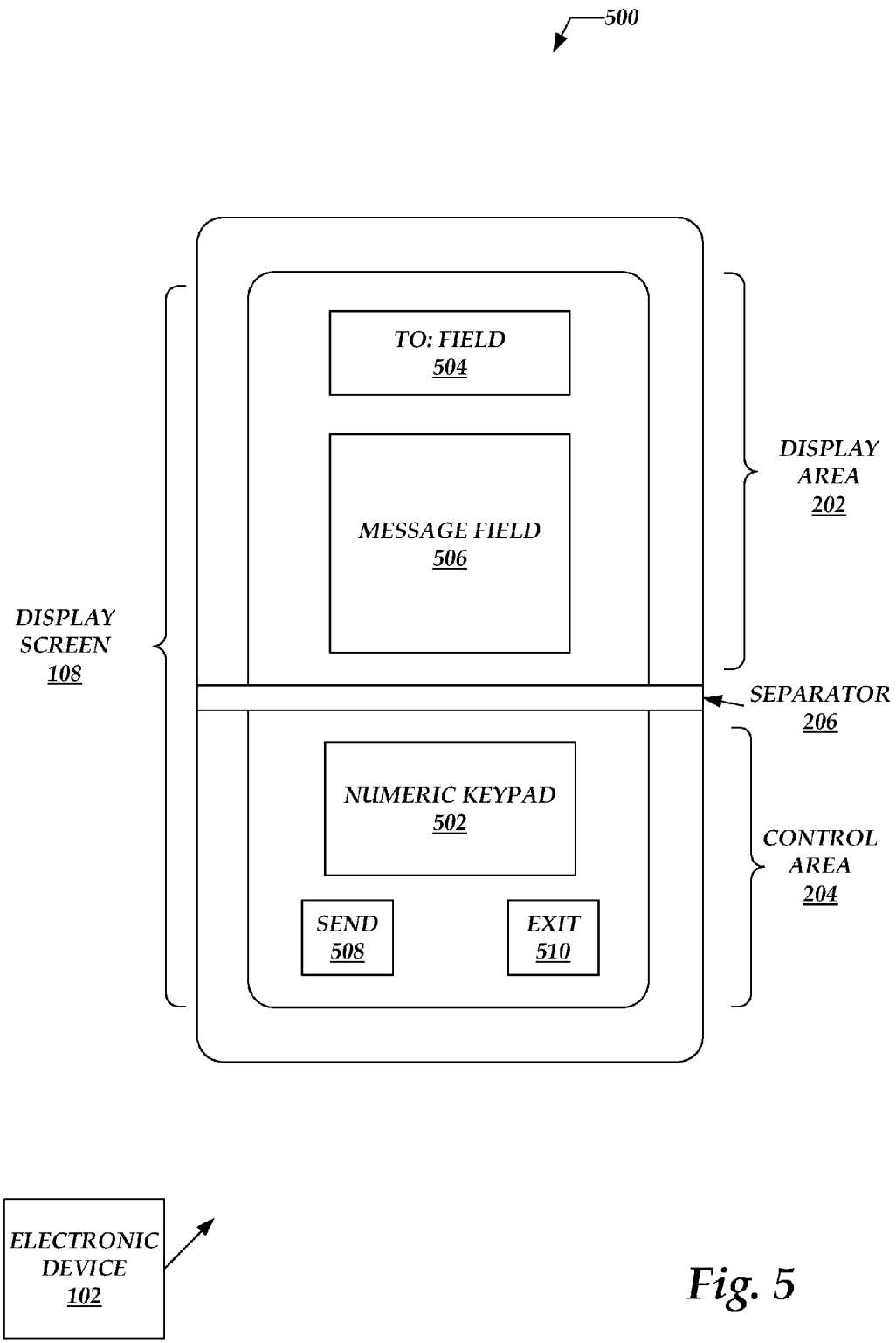
FIG. 5 is a block diagram illustrating further configurations of the user interfaces, with the control area depicting example configurations of numeric keypads.

FIG. 5 illustrates further configurations of the user interfaces, denoted generally at 500. As described in further detail below, the user interfaces 500 may be suitable for entering text into a given application (e.g., word processing, text messaging, text editing, or the like). In example implementations, a given user may access the user interfaces 500 by activating one of the icons 210 in FIG. 2 or one of the icons 302 in FIG. 3.

The control area 204 as shown in FIG. 5 may depict example configurations of a numeric keypad 502. The numeric keypad 502 may include individual buttons collectively labeled with the digits 0-9, along with any additional buttons deemed appropriate in a given implementation (e.g., buttons labeled "*", "#", or the like).

Turning to the display area 202, it may include a field 504 for receiving alphanumeric input. In example implementations, the field 504 may provide a "To:" field for a text messaging, instant message (IM), or e-mail application. For example, a given user may choose to expose and utilize the numeric keypad 502 to enter a telephone number into the field 504, to direct a telephone call, text message, or the like to that telephone number. In addition, the display area 202 may include a message field 506, for receiving alphanumeric input entered by the user. In example implementations, the alphanumeric input entered into the message field 506 may be a message body related to an e-mail, instant message, text message, or the like.

Once the message body entered into the message field 506 is complete, the user may activate a send button 508 to transmit the message. At any time, however, the user may exit the user interfaces 500 by activating an exit button 510.

Figure 6:
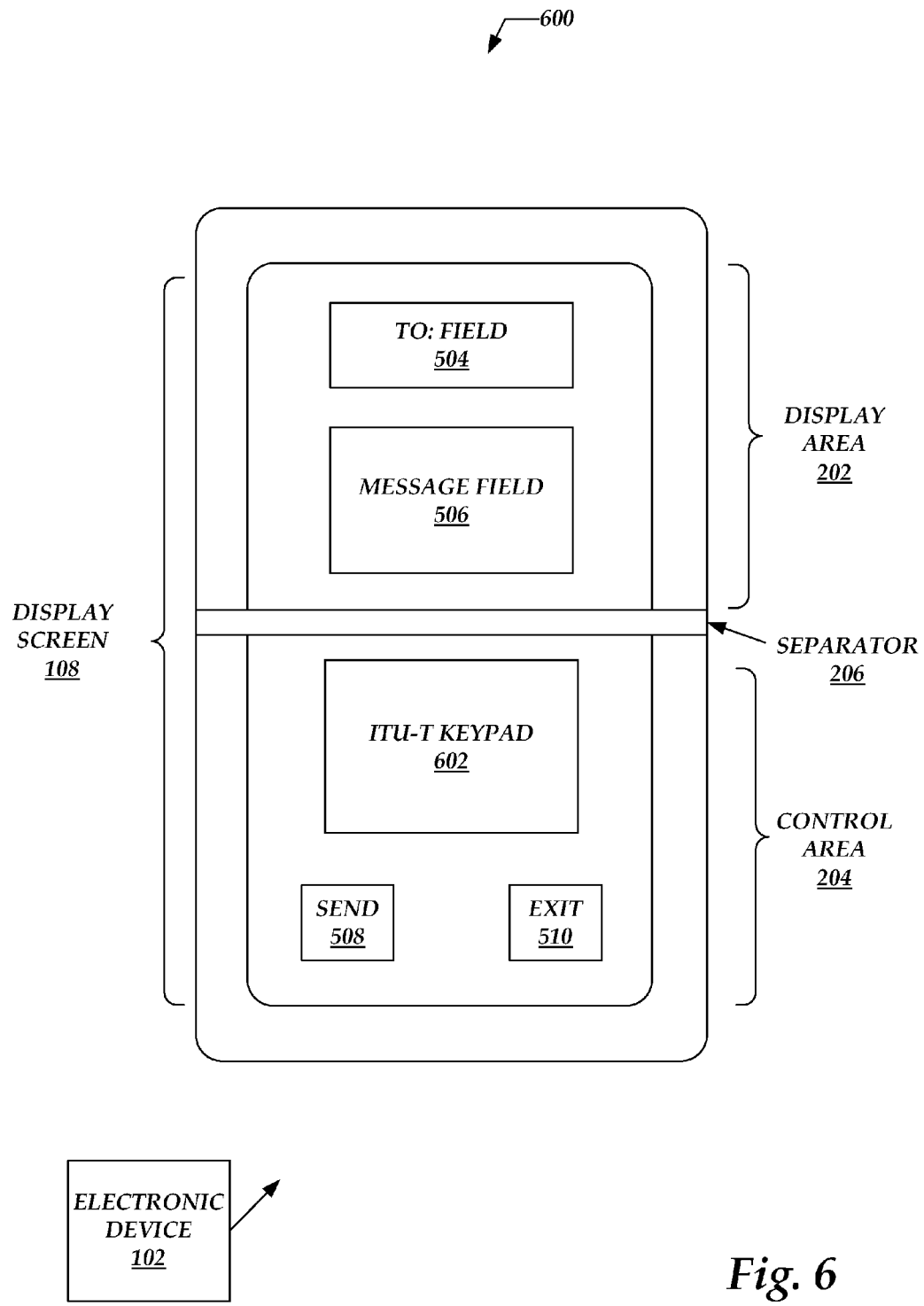
FIG. 6 is a block diagram illustrating further configurations of the user interfaces, with the control area depicting example configurations of alphanumeric keypads.

FIG. 6 illustrates further configurations of the user interfaces, denoted generally at 600. In example implementations, the user interfaces 500 shown in FIG. 5 may transition to the user interfaces 600 shown in FIG. 6. This transition may occur in response to the user sliding the separator 206 from a position shown in FIG. 5 to the position shown in FIG. 6. Although FIGS. 5 and 6, as well as the other drawing Figures shown herein, are not drawn to scale, the message field 506 as shown in FIG. 6 may be smaller than the message field 506 as shown in FIG. 5. In addition, the control area 204 in FIG. 6 may be larger than the control area 204 shown in FIG. 5.

Turning to the control area 204 as shown in FIG. 6, this control area 204 depicts alphanumeric keypads 602 that comply with the ITU-T standard for assigning the 26 basic Latin letters (a-z) to a 12-key telephone keypad. For example, the keypad button "2" may be labeled with the letters "abc", and so on. In this manner, the alphanumeric keypad 602 may enable users to enter alphanumeric characters into the fields 504 and/or 506 shown in the display area 202. The send button 508 and the exit button 510 are carried forward from FIG. 5 to represent similar functions in FIG. 6.

FIG. 7 illustrates further configurations of the user interfaces, denoted generally at 700, with the control area 204 depicting example configurations of QWERTY keypads 702. In example implementations, the user interfaces shown in FIG. 5 or 6 may transition to the user interfaces 700 in response to movement of the separator 206. As shown in FIG. 7, the fixed-size display screen 108 may be reapportioned into the display area 202 and the control area 204. More specifically, FIG. 7 illustrates a non-limiting scenario in which the control area 204 is expanded to accommodate a relatively large QWERTY keypad 702. Thus, the display area 202 as shown in FIG. 7 may be correspondingly smaller. The QWERTY keypad 702 may facilitate more efficient entry of alphanumeric text into the display area 202 (i.e., the fields 504 and/or 506).

Having provided the foregoing description of FIGS. 2-7, several observations are noted. The separator 206 may be controlled by hardware and/or software mechanisms, and may respond to user input registered through those mechanisms. Put differently, in some cases, the separator 206 may respond to commands provided directly by the user. In other cases, the separator 206 may move in response to user actions directed to icons (e.g., 210 in FIG. 2, 302 in FIG. 3, etc.). In these latter cases, the user may not explicitly request that the separator 206 move, but the separator 206 may nevertheless move indirectly in response to what the user did explicitly request.

FIG. 8 illustrates process flows, denoted generally at 800, that may be performed in connection with the adjustable user interfaces with sliding separators. Without limiting possible implementations, the process flows 800 may be performed by software modules that provide the user-configurable UI 112 as shown in FIG. 1. Put differently, the process flows 800 may be understood as elaborating further on illustrative processing performed in connection with the user-configurable UI 112. However, implementations of this description may perform at least parts of the process flows 800 using other components without departing from the scope and spirit of the present description.

Turning to the process flows 800 in more detail, block 802 represents populating or presenting an output or display area of a user interface. FIG. 2 provides examples of a suitable display area at 202. For example, block 802 may include rendering the general content 208 within the display area 202.

Block 804 represents populating or presenting an input or control area of the user interface. FIG. 2 provides examples of a suitable control area at 204. For example, block 804 may include rendering representations of any number of icons in the control area 204. FIG. 2 provides examples of such icons at 210a-210n, and FIG. 3 provides further examples of icons at 302a-302n.

Block 806 represents presenting a visible representation of a movable or slidable separator on a display screen (e.g., 108 in FIG. 1). FIGS. 2-7 provides examples of the separator at 206, as disposed between the display areas 202 and control areas 204.

Decision block 808 represents evaluating whether a user has activated an icon presented in the control area (e.g., 204). If decision block 808 determines that the user has activated an icon in the control area, the process flows may take Yes branch 810 to proceed to block 812. Block 812 represents performing one or more actions that are associated with the icon activated by the user. In some cases, as described above, actions associated with the activated icon may implicitly move the separator, even though the user may not have explicitly requested movement of the separator.

Afterwards, the process flows 800 may proceed to block 814, which represents receiving an indication of separator movement. If the process flows 800 reach block 814 via block 812, then the separator movement may result implicitly from icons activated by the user.

In some implementation scenarios, a given user may explicitly request movement of the separator, rather than activating or selecting icons. Returning to decision block 808, if the given user has not activated or selected any icons, but rather has explicitly requested movement of the separator, then the process flows 800 may take No branch 816 to block 814. Accordingly, if the process flows 800 reach block 814 directly from decision block 808, then the separator movement may result from an explicit request initiated by the user.

As appreciated from the foregoing description, in some cases, block 814 may include receiving indications of separator movement explicitly requested by the user. In other cases, block 814 may include receiving indications of separator movement implicitly resulting from activation or selection of icons.

Block 818 represents adjusting the proportions of control and display areas within a fixed-size display screen (e.g., 108 in FIG. 1). FIGS. 2-7 as described above illustrate several example scenarios in which display areas 202 and control areas 204 have their relative sizes adjusted in response to either explicit or implicit movement of the separator 206.

Block 820 represents altering a display of icons in the control areas 204, in response to the separator movement indicated in block 814. As shown above in the transition from FIG. 2 to FIG. 3, the type and number of icons (e.g., 210 and 302) may vary in response to user actions directed to particular icons.

It is noted that the process flows 800 shown in FIG. 8 may be repeated indefinitely, to process any number of actions directed to a given electronic device 102. However, in the interests of clarity, FIG. 8 does not explicitly illustrate this repetitive processing.

The foregoing description provides technologies for adjustable user interfaces with sliding separators. Although this description incorporates language specific to computer structural features, methodological acts, and computer readable media, the scope of the appended claims is not necessarily limited to the specific features, acts, or media described herein. Rather, this description provides illustrative, rather than limiting, implementations. Moreover, these implementations may modify and change various aspects of this description without departing from the true spirit and scope of this description, which is set forth in the following claims.

I claim:

1. An apparatus comprising at least one physical computer-readable storage medium having stored thereon computer-executable instructions that, when loaded into at least one hardware processor and executed, program the hardware processor to:
   present a control portion of a user interface on a fixed-size display device, the control portion configured to display a keypad;
   present a display portion of the user interface on the display device, the display portion configured to display corresponding alphanumeric text associated with input entered via the keypad;
   present a movable slider on the display device, so that the slider separates the control portion from the display portion;
   display the keypad in the control portion of the user interface, and display corresponding alphanumeric text entered via the keypad on the display portion;
   receive an indication that the slider has moved on the display device;

adjust relative proportions of the control portion and the display portion in response to the indication; and display the keypad as a numeric keypad when the slider is in a first position relative to the display device, and transition to display the keypad as one of an alphanumeric ITU-T standard keypad or a QWERTY keypad when the slider is in at least a second position relative to the display device while continuing to present the display portion of the user interface.

2. The apparatus of claim 1, wherein the instructions to receive an indication include instructions that programs the hardware processor to receive an indication of input manipulating the slider.

3. The apparatus of claim 1, wherein the computer-executable instructions that, when loaded into at least one hardware processor and executed, further program the hardware processor to move the slider on the display device in response to an icon presented on the display device being activated by a user action.

4. The apparatus of claim 1, the computer-executable instructions that, when loaded into the at least one hardware processor and executed, program the hardware processor to display the keypad as the alphanumeric ITU-T standard keypad when the slider is in the second position relative to the display device, and transition to display the keypad as the QWERTY keypad when the slider is in at least a third position relative to the display device.

5. The apparatus of claim 1, wherein application specific content is displayed in the display area when the slider is in the first position and when the slider is in the second position.

6. A display device comprising:
a fixed-size hardware display screen operable to provide an input control portion for displaying an icon associated with one of an application or a utility and for receiving a selection of the icon, and operable to provide an output display portion for presenting output associated with an executing one of the application or the utility when the icon is selected and the application or the utility thereby executed; and
a separator movable along the display screen, wherein the separator divides the input control portion from the output display portion, wherein the input control portion and the output display portion are resized relative to one another in response to movement of the separator, and wherein a numeric keypad presented on the display screen is altered to display one of an alphanumeric ITU-T standard keypad or a QWERTY keypad in response to movement of the separator while continuing to present the output display portion.

7. The display device of claim 6, wherein the separator is controllable in response to a software-implemented mechanism.

8. The display device of claim 6, wherein the separator is controllable in response to a hardware-implemented mechanism.

9. The display device of claim 6, wherein the separator is responsive to input to slide the separator relative to the display screen.

10. The display device of claim 6, wherein the separator on the display device moves in response to an icon presented on the display device being activated by a user action.

11. The display device of claim 6, wherein the alphanumeric ITU-T standard keypad presented on the display screen is altered to display the QWERTY keypad in response to movement of the separator.

12. The display device of claim 6, wherein application specific content is displayed in the output display area when the numeric keypad is presented on the display screen and when one of the alphanumeric ITU-T standard keypad or the QWERTY keypad is presented on the display screen in response to the movement of the separator.

13. A computer-based device comprising:
processing hardware;
display hardware;
a bus system coupled to communicate with the processing hardware and the display hardware; and
a computer-readable storage medium coupled to communicate with the processing hardware via the bus system, the computer-readable storage medium is encoded with computer-executable instructions that, when loaded into the processing hardware,
program the processing hardware to present a user interface on the display hardware,
wherein the user interface is divided into an output display portion and an input control portion that are separated by a movable separator,
wherein the user interface is responsive to re-positioning of the separator to resize the output display portion and the input control portion, and
display a numeric keypad when the moveable separator is in a first position relative to the display hardware, and to display one of an alphanumeric ITU-T standard keypad or a QWERTY keypad when the moveable separator is in at least a second position relative to the display hardware while continuing to present the display portion of the user interface.

14. The device of claim 13, wherein the keypad is presented in the input control portion, and wherein the output display portion is operative to display alphanumeric data entered through the keypad.

15. The device of claim 13, wherein the computer-readable storage medium is encoded with computer-executable instructions that, when loaded into the processing hardware, move the slider on the display device in response to an icon presented on the display device being activated by a user action.

16. The device of claim 13, wherein the computer-readable storage medium is encoded with computer-executable instructions that, when loaded into the processing hardware, display the alphanumeric ITU-T standard keypad when the moveable separator is in the second position relative to the display hardware, and display the QWERTY keypad when the moveable separator is in at least a third position relative to the display hardware.

17. The device of claim 13, wherein application specific content is displayed in the output display area when the separator is in the first position and when the slider is in second position.

* * * * *